US006567784B2

(12) United States Patent
Bukow

(10) Patent No.: US 6,567,784 B2
(45) Date of Patent: May 20, 2003

(54) METHOD AND APPARATUS FOR MATCHING PROJECTS AND WORKERS

(75) Inventor: Hans Max Theodore Bukow, San Francisco, CA (US)

(73) Assignee: eWork Exchange, Inc., San Francisco, CA (US)

( * ) Notice: Subject to any disclaimer, the term of this patent is extended or adjusted under 35 U.S.C. 154(b) by 238 days.

(21) Appl. No.: 09/325,620

(22) Filed: Jun. 3, 1999

(65) Prior Publication Data

US 2002/0026338 A1 Feb. 28, 2002

(51) Int. Cl.$^7$ .............................................. G06F 17/60
(52) U.S. Cl. ................... 705/9; 705/7; 705/8
(58) Field of Search .............................. 705/7, 8, 9, 10, 705/11

(56) References Cited

U.S. PATENT DOCUMENTS

| | | | | |
|---|---|---|---|---|
| 5,117,353 A | * | 5/1992 | Stipanovich et al. | 374/401 |
| 5,164,897 A | * | 11/1992 | Clark et al. | 364/401 |
| 5,913,201 A | * | 6/1999 | Kocur | 705/9 |
| 6,092,197 A | * | 7/2000 | Coueignoux | 713/200 |

FOREIGN PATENT DOCUMENTS

| | | | | |
|---|---|---|---|---|
| EP | | 0866411 A1 | * 9/1998 | G06F/17/60 |

OTHER PUBLICATIONS

Buhler, Selecting the right person for the job: No small challenge, Jan. 1998, Supervision, vol. 59 No. 1, pp. 7–9.*
Huo and Kearns, Optimizing the Job–Person Match with Computerized Human Resource Information Systems, 1992, Personnel Review, vol. 21 No. 2, pp. 3–18.*
Infonautics Launches Job Sleuth, The Internet–Wide Job Search Agent, May 1999, PR Newswire.*
Parkes, Job–shopping Web–style: Web sites match companies and job seekers in ways previously impossible, Jan. 1997, DBMS, vol. 10 No. 1.*
Fry, Buying the Goods—Person to Person, Dec. 1998, The Wall Street Journal, p. R12.*
McManus, Melanie, *"Recuitment Jambalaya,"* Credit Union Management, May 1998, vol. 21, No. 5, pp. 48–51.

* cited by examiner

Primary Examiner—Joseph Thomas
Assistant Examiner—Christopher L. Gilligan
(74) Attorney, Agent, or Firm—Pillsbury Winthrop LLP

(57) ABSTRACT

A method of matching projects and workers using both both mandatory, or binary, characteristics and quantitative characteristics is described. The projects and workers have a number of characteristics that are symmetric. For example, the project has an activity characteristic that defines what is to be done and the worker has an activity characteristic describing what she/he wants to do. Project creators and workers can request matching workers and projects, respectively. The matching process itself occurs in two stages. In the first stage, the mandatory characteristics are considered. Only workers, or projects, meeting the mandatory characteristics are selected for further evaluation at the next stage. At the second stage, the quantitative characteristics are evaluated for the workers, or projects. The result is a subset of the total number of workers, or projects, matching the project criterion, or worker needs, ranked based on the quantitative characteristics.

24 Claims, 8 Drawing Sheets eWork xchange
"The Internet Workplace"

Matching Questions about our Process? Click Here for Answers!
🔻 Information  🔀 Matching  ✍ Contracting  ⊚ eWorking

Project Feedback eWorker you worked with
[Select ▼] ⓘ ~600

Timeliness
Did you receive information, answers, project deliverables, etc., in a timely manner?
[Select ▼] ⓘ ~602

Value
How was the work you received relative to what you paid?
[Select ▼] ⓘ ~604

Capability
Did the people you worked with exhibit the skills and flexibility to perform the project relative to the years of experience they specified?
[Select ▼] ⓘ ~606

Quality
Did the person(s) you worked with perform quality work?
[Select ▼] ⓘ ~608

Overall
Would you work on another project with the same eWorker(s)?
[Select ▼] ⓘ ~610

Project Time and Cost
How close was the actual Project Start Date from the intended Start Date?
Earlier...                                                    ...Later

- Project Profiles
- Post eWork Project
- Want eWork
- Project Feedback
- Logout Contact eWork

FIG. 6

Quality
Did the person(s) you worked with perform quality work?

[Select ▼] ⓘ ~~608

Overall
Would you work on another project with the same eWorker(s)?

[Select ▼] ⓘ ~~610

Project Time and Cost

How close was the actual Project Start Date from the intended Start Date?

| Earlier... | | | | | | ... Later |
|---|---|---|---|---|---|---|
| 4 weeks+ | 1-4 weeks | 1 week | On Time | 1 week | 1-4 weeks | 4 weeks+ |
| ○ | ○ | ○ | ● | ○ | ○ | ○ |

How close was the actual Project End Date from the intended End Date?

| Earlier... | | | | | | ... Later |
|---|---|---|---|---|---|---|
| 4 weeks+ | 1-4 weeks | 1 week | On Time | 1 week | 1-4 weeks | 4 weeks+ |
| ○ | ○ | ○ | ● | ○ | ○ | ○ |

How close was the actual Project Cost from the intended Cost(s)?

| Less ... | | | | | | ... More |
|---|---|---|---|---|---|---|
| 4 weeks+ | 1-4 weeks | 1 week | On Time | 1 week | 1-4 weeks | 4 weeks+ |
| ○ | ○ | ○ | ● | ○ | ○ | ○ |

Comments

[                    ]

[ SUBMIT ]

eWork    Information    Matching    Contracting    eWorking

FIG. 7

Matching Questions about our Process? Click Here for Answers!
▽ Information  ⚇ Matching  ⚒ Contracting  ⊚ eWorking

Post eWork Project

Project Description eWork Project Name
[                    ] ⓘ ~800 eWork Category
[Select Category ▼] ⓘ ~802

Industry Expertise
[Select Industry ▼] ⓘ ~804 eWork Project Description
[                    ] ⓘ ~806

Related URL
http:// [                    ] ⓘ ~808

Software Required
[                    ] ⓘ ~810

Project Time and Cost

Start Date
[Month ▼] [Day ▼] [Year ▼] ⓘ ~812

End Date
[Month ▼] [Day ▼] [Year ▼] ⓘ ~814

E-mails Sent per Day
[Unlimited ▼] ⓘ ~816

Sidebar:
- Project Profiles
- Post eWork Project
- Want eWork
- Project Feedback
- Logout
- Contact eWork

FIG. 8

METHOD AND APPARATUS FOR MATCHING PROJECTS AND WORKERS

BACKGROUND OF THE INVENTION

1. Field of the Invention

This invention relates to the field of matching projects and workers. In particular, the invention relates to a web enabled system for matching projects and workers.

2. Description of the Related Art

Matching is a difficult process because it requires that a computer, or human, identify combinations that will work well. Because of the complexity of the problem, most prior systems do not attempt to actually perform any matching, but rather they provide a forum in which parties can meet.

Traditionally newspaper classified ads were one way of brining parties together, e.g. buyers and sellers, employers and employees, etc. More recently, online systems such as bulletin boards, newsgroups, web classifieds, and even online auctions have provided for parties to meet.

All of these rely on the parties to make matches. No centralized attempt is made to match parties. For example, Jane Doe might post a want to buy classified ad while Jim Brown might post a for sale classified ad, both for a Toyota Camry. Unless Jane sees Jim's ad, or vice versa, they will not know of the other's ad and have an opportunity to complete a transaction. Online systems can offer search functions that can improve the chances that Jane may find Jim's ad, or vice versa. However, unless Jane, or Jim, uses the search function, they will not know of the other's ad.

The matching problem is equally prevalent in the employment area. For example, a contractor developing a web site might need a subcontractor to develop artwork for the web site. Finding that subcontractor can be difficult and the global reach of the Internet has greatly broadened the ability to work with geographically dispersed employees.

However, the prevalence of the Internet can also increase business risks. Traditional contracting and employment was done based on reputation, past performance, references, and other qualitative measures. The anonymity allowed by the Internet can make it difficult to ascertain information in an efficient manner. The prior systems that were used to bring buyers and sellers together provide no mechanism for incorporating quantitative measures of performance into the matches.

Accordingly, what is needed is a method for allowing parties to match projects to workers that allows for the inclusion of quantitative measures in the matching.

SUMMARY OF THE INVENTION

A method of matching projects and workers using both mandatory, or binary, characteristics and quantitative characteristics is described. The projects and workers have a number of characteristics that are symmetric. For example, the project has an activity characteristic that defines what is to be done and the worker has an activity characteristic describing what she/he wants to do. Project creators and workers can request matching workers and projects, respectively. The matching process itself occurs in two stages. In the first stage, the mandatory characteristics are considered. Only workers, or projects, meeting the mandatory characteristics are selected for further evaluation at the next stage. At the second stage, the quantitative characteristics are evaluated for the workers, or projects. The result is a subset of the total number of workers, or projects, matching the project criterion, or worker needs, ranked based on the quantitative characteristics. The size of the subset can be restricted to show only the top n or the top x% of matching workers, or projects, from the first stage.

BRIEF DESCRIPTION OF THE FIGURES

FIGS. 2–8 are screenshots showing the web interface to various aspects of one embodiment of the invention.

DETAILED DESCRIPTION

A. System Overview

Figure 1:
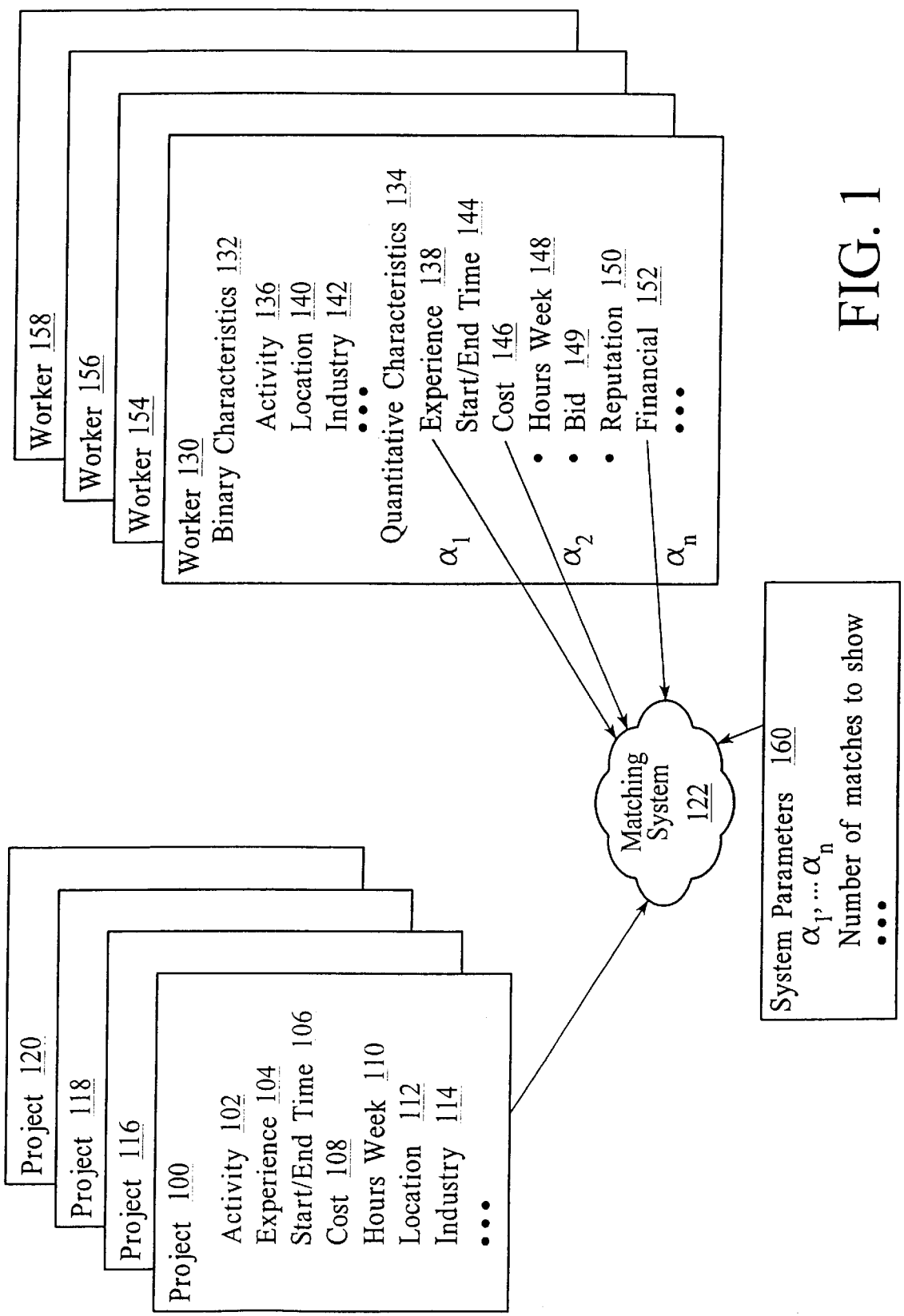
FIG. 1 illustrates a system including one embodiment of the invention.

FIG. 1 illustrates a system including one embodiment of the invention. The system can be coupled to a web interface to allow distributed access to the system over the Internet. The system supports matching projects and workers.

This paragraph lists the elements of FIG. 1 and their interconnections. FIG. 1 includes projects 100, 116, 118, and 120, workers 130, 154, 156, and 158, a matching system 122, and system parameters 160. The project 100 includes an activity 102, an experience 104, a start/end time 106, a cost 108, hours per week 110, a location 112, and an industry 114. The worker 130 includes binary characteristics 132 and quantitative characteristics 134. The binary characteristics 132 include an activity 136, a location 140, and an industry 142. The quantitative characteristics 134 includes an experience 138, a start/end time 144, a cost 146, an hours per week 148, a bid 149, a reputation 150, and a financial 142. The matching system 122 is capable of accessing the projects 100, 116, 118, and 120 and the workers 130, 154, 156 and 158. The matching system 122 can also access the system parameters 160.

The following describes the uses of the elements of FIG. 1. FIG. 1 is shown from the prospective of matching workers (e.g. the workers 130, 154, 156, and 158) to a newly created project (e.g. the project 100), accordingly not all characteristics of the project 100 are shown.

Projects and workers are symmetric, e.g. projects define what a party wants done and workers are descriptions of what a party wants to do. For example, the activity 102 described by the project 100 is an activity that the party who created the project 100 wants done. Similarly, the activity 136 described by the worker 130 is an activity that the worker 130 does. Therefore, a project may have any of the characteristics of a worker and vice versa.

The different characteristics used by some embodiments of the invention are discussed first. Then an explanation of how the characteristics are used by some embodiments of the invention follows.

Activities

Activities are tasks that are to be performed, or that someone is interested in performing. Some examples of activities (e.g. the activity 102 and the activity 136) include art creation, business modeling, diagraming, flowcharting, software programming, language translating, writing, proofreading, researching, and/or some other type of activity. In some embodiments of the invention, the matching system 122 is integrated with a web site that specializes in particular types of activities, e.g. Internet related. In other embodiments, the matching system 122 is integrated with a web site that includes a range of activities such as non-technical jobs like temporary positions (e.g., free-lance writing), and full-time employment.

In some embodiments, an activity is considered to be a binary characteristic. A characteristic is binary if it is a required element, e.g. the worker must absolutely fit that characteristic. For example, if the worker 154 is listed only for the activity of web artwork, she/he can just be excluded from consideration for matching with any project (e.g. the project 116) with an activity other than web artwork.

Experience is a measure of how much background a prospective worker should have, or a worker does have, in performing the activity. For example, if the activity 102 is web artwork, then the experience 104 might specify two years experience. In some embodiments, specific certification or degree requirements can be specified, e.g. Microsoft™ certified level n and/or bachelors degree in computer science, etc. The information in the worker 130 description is similar. The experience 138 corresponds to the experience of the worker 130 with the activity 136. For example, the worker 130 might have five years experience with web artwork. In some embodiments, experience is evaluated quantitatively for matches.

The start/end time 106 allows the timing of the project 100 to be specified. It need not be literally specified as a starting and ending date. For example, the start/end time 106 might simply specify a required completion date. The corresponding information in the worker 130 description is the start/end time 144 that describes when the worker 130 is available to perform the activity 136. In some embodiments, start/end time is evaluated quantitatively for matches.

In some embodiments, two quantitative assessments are made from the start/end time 106. The first is the total number of days of availability for the workers is compared to the total number of days of availability sought by the project. The second is the difference between the midpoint of the start/end time in the project and the midpoint in the start/end time availability of the workers.

The cost 108 allows the amount to be paid for the project 100 to be specified. Similarly, the cost 146 allows the worker to specify the amount she/he wants to be paid. In some embodiments, the cost 108 and/or the cost 148 are expressed in terms of an hourly wage, e.g. $50/ hour. In other embodiments, the cost 108 and/or the cost 148 is expressed on a per project basis, e.g. $2,000 for project 120 or $2,000 for one set of web artwork.

The hours per week 110 allows the amount of work to be done per week for the project 100 to be specified. Similarly, the hours per week 148 allows the worker 130 to specify how much they want to work. For example, a party defining a project might want 30 hours of work per week, but the worker 130 might only want to do 25 while the worker 154 wants to do 40. The system can evaluate this quantitatively to provide the best match.

The location 112 and the industry 114 allow the project 100 to more clearly specify required characteristics of a worker. The location 112 could be a geographical region, e.g. San Francisco Bay Area, a zip code, a specific city, and/or some other location. If the project 100 specifies a location 112, then it is a binary characteristic, and only workers (e.g. the worker 130) whose location (e.g. the location 140) falls within the location 112 will be considered for matching. This is useful if a project requires a physical presence, e.g. build a garage, or if a party prefers to work with local people.

The industry 114 allows the activity to be further specialized. For example, if the activity was nursing care, then the industry 114 might be home nursing care, home childcare, etc. Similarly, if the activity is web site design, the industry 114 might reflect the background required or the field the web site will cover, e.g. banking, aerospace, etc. If the project 100 specifies an industry 114, then it is a binary characteristic, and only workers (e.g. the worker 130) whose industry (e.g. the industry 142) includes the industry 114 will be considered for matching. In some embodiments, the location 112 and the industry 114 are evaluated quantitatively, e.g. people with the criteria are given a 100% and people without the criteria are given a 0%. A weight is assigned to allow those with the requested criteria to be matched more often than those without the criteria.

The bid 149 allows a worker to specify how much he/she is willing to pay for a successful match. In some embodiments of the system this allows workers (e.g. the workers 130, 154, 156, and 158) to pay a small fee for a preference in matching. This also can provide a funding source for the system. For example, if the worker 130 indicates her bid 149 is $5 and the worker 158 indicates a bid of $10. In this example, the worker 158 may be ranked higher and introduced to prospects sooner than the worker 130, all other factors being equal or similar.

The reputation 150 includes information about what a worker has done before. In some embodiments, the reputation 150 is gathered through surveys distributed to project creators as well as feedback surveys from workers. In some embodiments, the matching system 122 is web enabled and hypertext markup language (HTML) forms are used to present an evaluation form to project creators and workers. The project creator evaluation allows the employer to evaluate the worker on various performance factors: timeliness, responsiveness, cost control, value for the money, capability, quality, and/or other factors. In some embodiments, an even tiered ranking system is used for some of the performance factors as this prevents centering on "3", for example, as occurs in 1–5 rating systems.

In some embodiments, the amount of feedback a worker gives is also included in the reputation 150. The more feedback a worker or project provider gives the more value he/she gathers when matching in the future. This, also, allows the worker to rate the project, the appropriateness of the description, the ease of working with a particular employer, and/or other factors. This information can be used in deciding whether to allow a particular project creator to continue providing projects. For example, if workers consistently indicate that a particular project creator is unreasonable or difficult to work with, that project creator can be excluded from creating new project. Additionally, the worker feedback is available to other workers when evaluating whether to take a project.

In some embodiments, the reputation 150 is evaluated quantitatively by computing the worker's average rating as one characteristic and computing the total amount of feedback given and received as another characteristic, e.g. number of project creator evaluations plus number of worker evaluations of projects. Thus, workers are rewarded for contributing feedback to the community.

The financial 152 includes financial information about the worker. This could be externally obtained information or information derived based on past history of the worker 130 with the matching system 122. In some embodiments, one or more external ratings can be used such as credit reports, better business bureau records, and/or other financial reports.

In some embodiments, the past financial history of bid payments is used to evaluate workers. For example, in some embodiments, the last "n" bid amounts paid to the operator of the matching system 122 by the worker are tracked. For example, if worker 130 paid $10, $0, $20, $30, $50, and $0 to get her last six projects, that information can be used to evaluate the worker. Two characteristics are considered from this bid history by some embodiments of the invention: total payments and average payments. In other embodiments, all, or some portions of, past bids are tracked using weighted averages so that the oldest information is given the least weight.

Matching Process: Stage 1

In some embodiments, the matching process is manually requested. For example, after a project (e.g. the project 100) is created, the creator signals on a "Match" user interface object to cause the project to be matched against the current set of workers. Similarly, after a worker defines her/his interests and desired work, she/he can request to be matched against existing projects. In other embodiments, the matching process periodically updates matches as the projects and workers within the system change.

In this example, the addition of the project 100 to the system with several thousand workers will be considered. The process is symmetrical so the description applies to adding a worker as well as to adding a project.

Once the project is defined and a match is requested, the matching system 122 proceeds through a two stage process to find matches. The first stage uses the binary characteristics, activity, location and industry here, to reduce the number of workers being considered.

For example, if there are ten thousand workers and the activity 102 is web artwork, perhaps only one hundred workers in the system have indicated that they are interested in doing web artwork. By eliminating the other 9,900 records at this stage, the matching process can occur rapidly. In other embodiments, the binary characteristics are considered quantitatively with scores of 0% if the characteristic is missing and 100% if it is present. A weight can then be used so that workers, or projects, with the appropriate characteristics are ranked higher.

The same binary selection is performed on the location 112 and the industry 114. In this example, only the four workers (e.g. workers 130, 154, 156, and 158) shown in FIG. 1 remained after the location 112 of San Francisco Bay Area and the industry 114 of aerospace were considered.

In some embodiments, the worker and project information is stored in a database coupled in communication with the matching system 122. In these embodiments, the matching system 122 can issue a single query to select, and retrieve, the matching workers for the binary characteristics. Here, the database information for the workers 130, 154, 156, and 158 would be selected and retrieved.

Matching Process: Stage 2

The next part of the matching process is to quantitatively evaluate the other characteristics. In order to compare disparate characteristics, they can be normalized from between 0% and 100%. Then, weights can be assigned to each characteristic to combine the normalized results. This weighted average is called a match coefficient.

To normalize a single characteristic, the minimum, maximum, and range from the requested value are used. Table 1 shows a sample data set for the cost 146 values for the four workers 130, 154, 156, and 158 for the project 100 where the cost 108 is $45.

TABLE 1

| Worker # | abs(Worker Cost − Project Cost) |
|---|---|
| 130 | abs(55 − 45) = 10 |
| 154 | abs(80 − 45) = 35 |
| 156 | abs(30 − 45) = 15 |
| 158 | abs(40 − 45) = 5 |

From table 1, the minimum maximum and range can be computed for the values in as shown in Table 2.

TABLE 2

| | Value |
|---|---|
| Minimum | 5 |
| Maximum | 35 |
| Range | 30 |

These values can be used to normalize the characteristic from 0% to 100% relative to the range according to Equation 1.

$$coeff = \frac{\max diff - diff}{range} \quad (1)$$

So, the coefficient for each of the workers can be determined as shown in Table 3.

TABLE 3

| Worker # | Coefficient |
|---|---|
| 130 | 100 × (35 − 10)/30 = 83% |
| 154 | 100 × (35 − 35)/30 = 0% |
| 156 | 100 × (35 − 15)/30 = 66% |
| 158 | 100 × (35 − 5)/30 = 100% |

Thus, the worker 158 who had the hourly rate closest to the requested rate was ranked highest. In this example, that is not the lowest priced worker, the worker 156 here. Some embodiments of the invention use different normalization techniques for different characteristics. For example, in some embodiments of the invention, the project 100 does not specify values for the reputation 150. Therefore that characteristic can be normalized without subtracting the project amount as was done for cost in Table 1.

The next step is to compute the weighted average of the coefficients to find the match coefficient. The weighted average can be expressed by Equation 2.

$$match\ coeff = \sum_i \alpha_i \times coeff_i \quad (2)$$

Where i ranges over the set of the characteristics, $\alpha_i$ is the weight attached to characteristic i, and $coeff_i$ is the normalized coefficient for characteristic i. Note, $$\sum_i \alpha_i = 1.$$

In some embodiments, the system parameters 160 include the weights, $\alpha_i$. In other embodiments, a project (e.g. the project 100) can specify project specific weights. In either case, the n workers with the highest match coefficients are selected by the match system 122.

The number of workers matched can be controlled by the system parameters 160 or by a project specific setting for n. Also, the project creator can indicate when they do not want to see additional matches or require that all additional matches exceed a currently viewed worker. For example, if the project creator was viewing the worker 100 who had a match coefficient of 90%, the project creator could signal that all further matches viewed must equal or exceed that coefficient. This feature is particularly useful in embodiments where additional matching is automatically performed as workers are added and/or updated.

Weight Values for Match Coefficient

Table 4 shows the weight values for computing the match coefficient according to some embodiments of the invention.

TABLE 4

| Characteristic | 1 | 2 | 3 | 4 | 5 |
| --- | --- | --- | --- | --- | --- |
| Project Related | 25% | 20% | 50% | 40% | 60% |
| Start/End Time Duration | 5% | 4% | 10% | 8% | 10% |
| Start/End Time Midpoint | 5% | 4% | 10% | 8% | 10% |
| Cost | 5% | 4% | 15% | 8% | 15% |
| Hours per week | 5% | 4% | 10% | 8% | 10% |
| Experience | 5% | 4% | 5% | 8% | 15% |
| Bid | 25% | 10% | 10% | 10% | 5% |
| Financial | 25% | 60% | 20% | 10% | 15% |
| Avg. Payment | 12.5% | 30% | 10% | 5% | 5% |
| Total Payments | 12.5% | 30% | 10% | 5% | 10% |
| Reputation | 25% | 10% | 20% | 40% | 20% |
| Feedback Amt. | 12.5% | 5% | 12% | 20% | 12% |
| Rating | 12.5% | 5% | 8% | 20% | 8% |
| Total | 100% | 100% | 100% | 100% | 100% |

The actual coefficients can be adjusted for a particular project, activity, and/or class of activities. For example, the Internet is relatively new and workers with many years of experience may be less common, and less important, while reputation issues may be more important. Therefore, if the matching system 122 is being used primarily for Internet, the weight for experience may be reduced in favor of a heavier weight for reputation.

The embodiments shown include a variety of alternative configurations emphasizing, or de-emphasizing, various components. For example, embodiments 3, 4 and 5 are heavily project centered so that project characteristics are given heavy weights. In contrast embodiment 2 is more heavily financially centered, this might be used if there is a high correlation between financial performance and overall outcomes.

The specific characteristics used can vary as well. For example, as part of the financial characteristic an outside credit rating could be considered. Similarly, characteristics can be excluded. For example, the hours per week characteristic could be excluded from consideration for jobs that do not require a specific number of hours in a given week.

B. Web Interface

FIGS. 2–8 are screenshots showing the web interface to various aspects of one embodiment of the invention. Many different variations of the interface appears in the various embodiments of the invention. For example, features, topics and/or other content could be grouped differently on the web pages. Java applications, or other applications, could be written to directly access the matching system. The interface of FIGS. 2–8 are merely exemplary.

Figure 2:
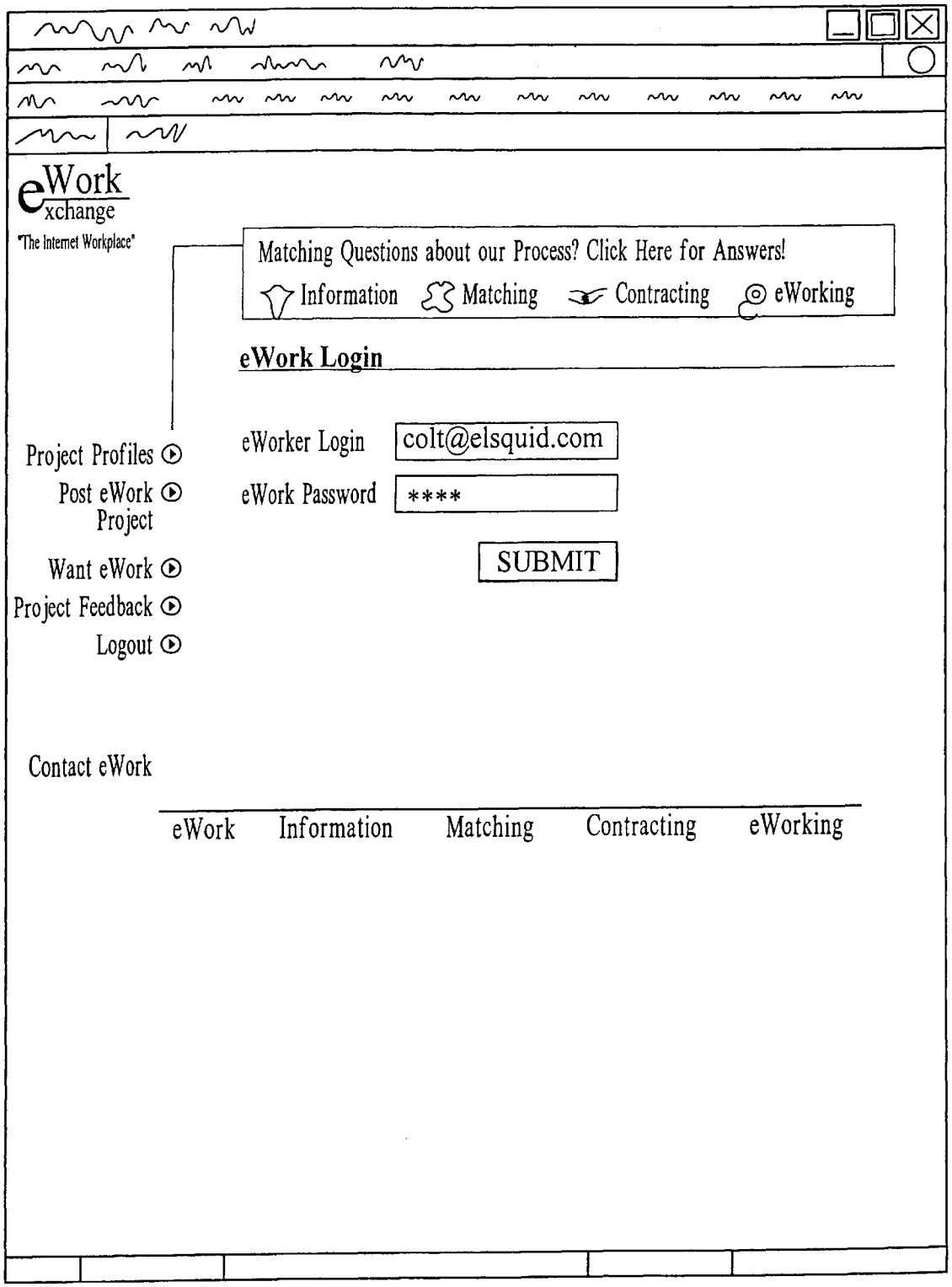

FIG. 2 shows a login web page that allows a person to identify herself/himself to the system. Here, the user identifies herself as Jane Colt by using her e-mail address and password.

Figure 3:
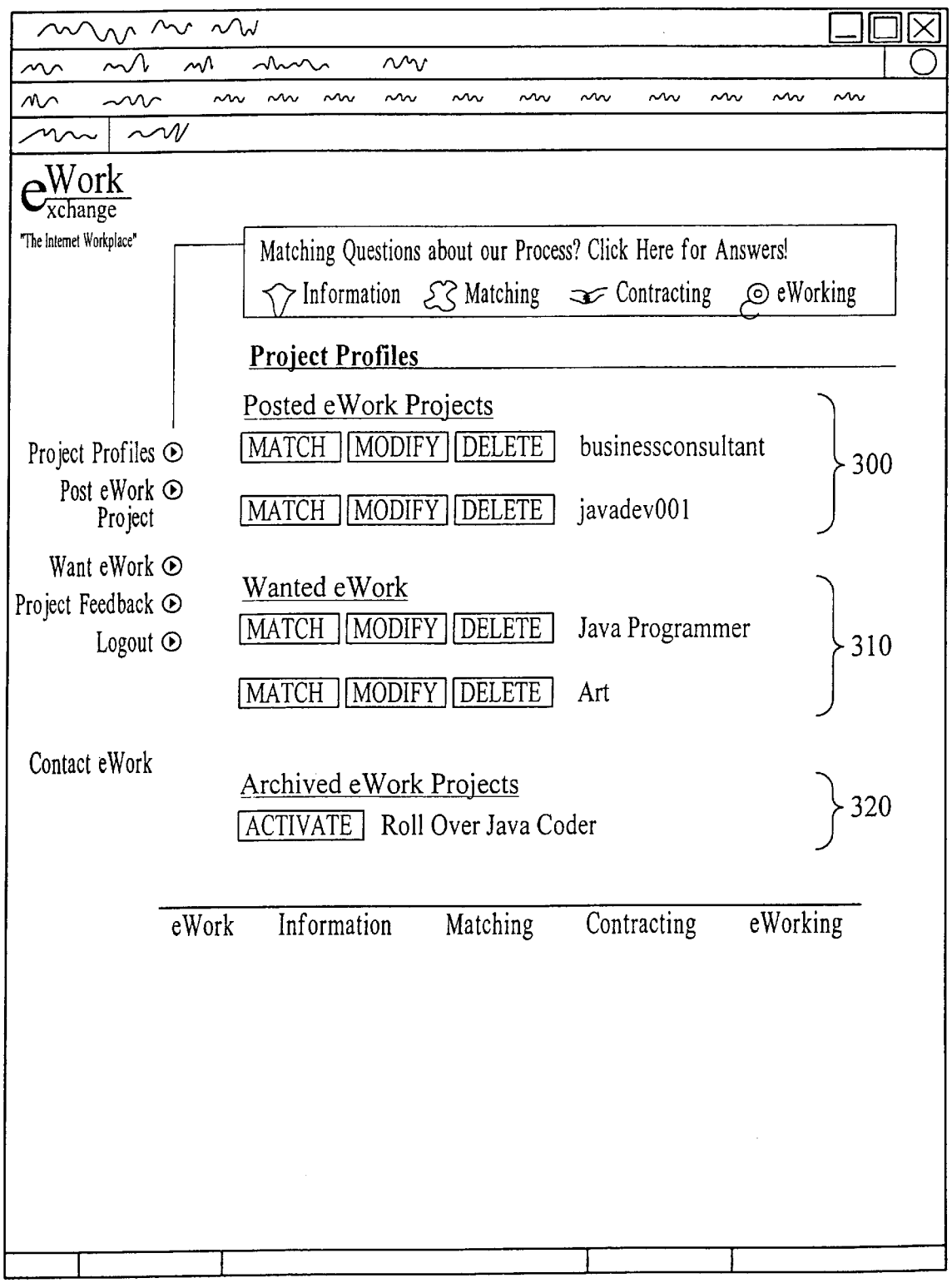

FIG. 3 shows a web page summarizing the active projects and active work sought by the user. Posted projects are listed in area 300. Here the area 300 shows that Jane has posted two projects: a business consultant job and a Java development job. The area 310 lists work that Jane is seeking. Here she has listed two types of jobs she would be interested in doing: Java programming and art work. Conceptually, Jane's two job requests correspond to two separate workers (e.g. the worker 130 and 154).

The web page also can include an area 320 where projects can be saved online. In this case, Jane has archived a project she called "Roll Over Java Coder". A project can be archived if the user fails to complete the project description and logs out of the system or if a user wishes to save a project description for a later date, and/or for other reasons.

From this page, Jane can delete and/or modify any of her posted projects as well as her work interests. Jane can also request that her projects be matched against worker abilities and/or that her worker abilities be matched against projects. The match button associated with each item in the areas 300 and 310 initiates the matching process described above.

Figure 4:
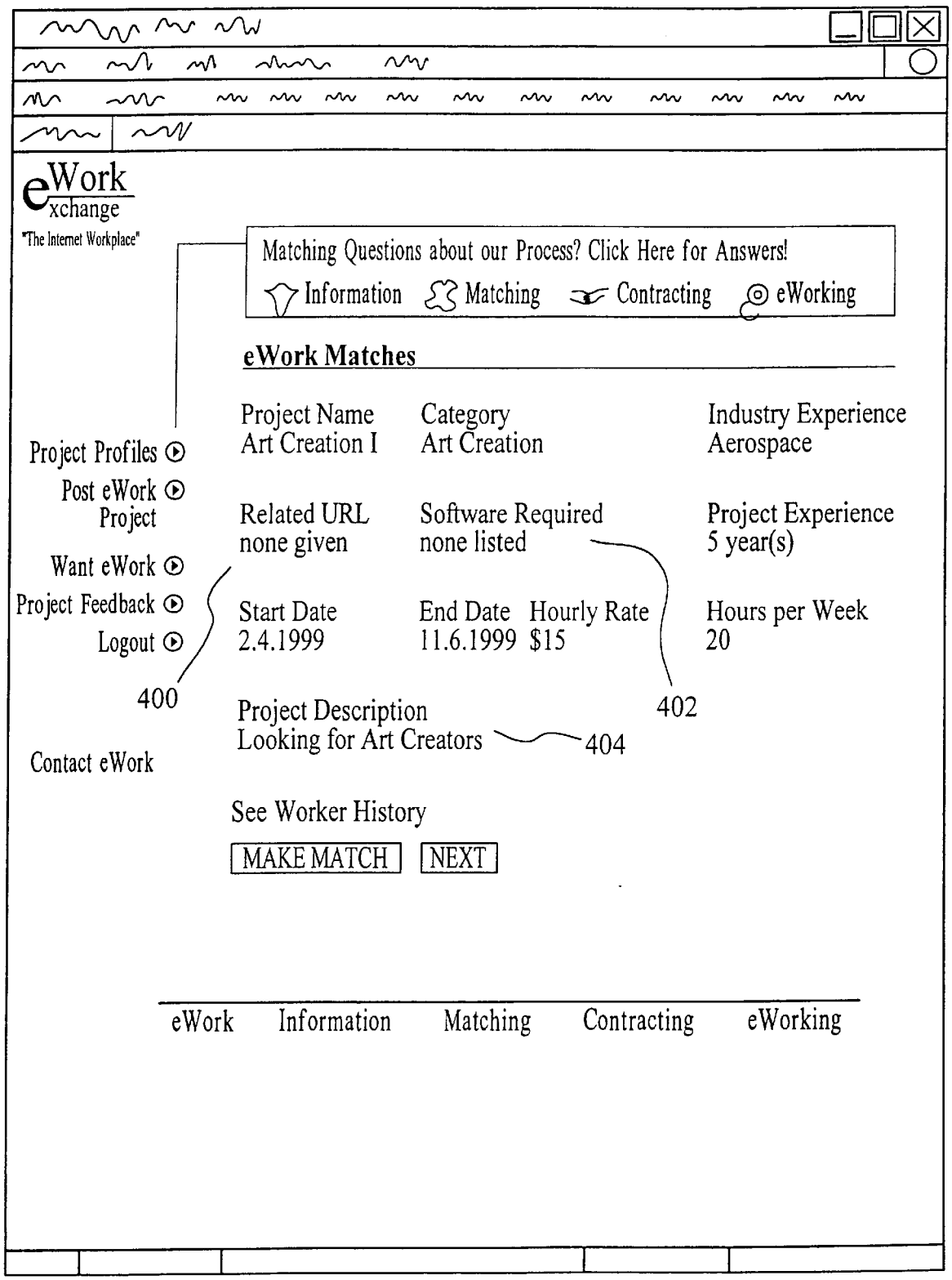

FIG. 4 shows a sample match for a project corresponding to one of Jane's work requests, the art work request listed in the area 310. The description shown provides additional descriptive information such as a uniform resource locator (URL) 400, a description of required tools, licenses, and/or materials, etc. 402, e.g. software, and a textual project description 404. These allow workers like Jane to more fully evaluate the project. If they are interested they can send a message to the project creator requesting the job. The message could be sent by e-mail, fax, pager, telephone, web page, and/or some other medium. For example, in some embodiments, the project creator can designate a priority for receiving messages about matches, e.g. "urgent—send page on match", etc.

Figure 5:
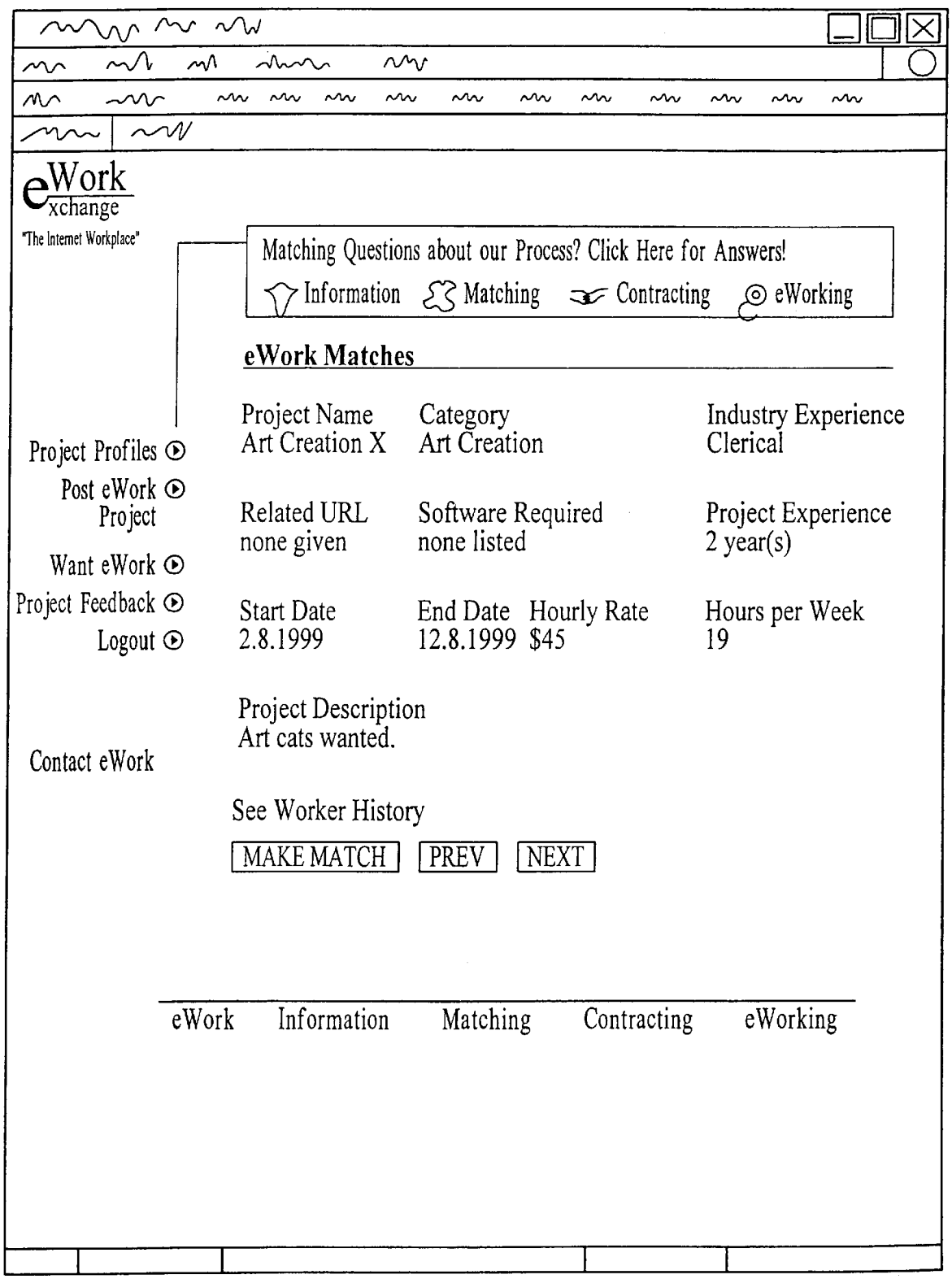

FIG. 5 shows another sample match for a project corresponding to Jane's work request for art projects.

FIGS. 6 and 7 show a hypertext markup language (HTML) form for providing feedback about worker performance. Jane might use this form after a worker finished a project for her. The form includes a worker identification 600, a timeliness rating 602, a value rating 604, a capability rating 606, a quality rating 608, an overall rating 608, and three project time and cost ratings as to whether the project started on time 612, finished on time 620, and how close the costs were to the projected costs, 622, also a free form comments field is provided 624. A similar form may be used by workers to rate their satisfaction with projects.

FIG. 8 shows a portion of an HTML form for describing an event. The form allows the project creator to provide a name, select the activity type from a list 802, select an industry 804, describe the project 806, provide a URL 808, provide information about required software 810, and set a variety of information about the project time and cost 812–814, and the other characteristics of the project. Also shown is a number of e-mails a day setting 816 that allows the project creator to control how many messages the project creator is interested in receiving about the project from workers. For example, many activities may have a large number of matches. By limiting the number of messages to 30, the project creator can limit the number of workers she/he has to consider. In some embodiments, the project creator can specify other rules for notification. For example, "only notify me if a match is X% better than the best match so far, or is within X% of the best match so far." Other rules can be more complex. For example, notify me of the first ten matches, then each match after that is at least as good as the middle of the first matches. What is important is that the project creator can specify how often and how he/she will be notified about matches.

C. Alternative Embodiments

In some embodiments, the matching system 122 and/or web interface are implemented as one or more computer programs. The computer programs can be included in one or more computer usable media such as CD-ROMs, floppy disks, or other media.

Some embodiments of the invention are included in an electromagnetic wave form. The electromagnetic wave form comprises information such as the matching system 122, the web interface, and project and worker data. For example, the electromagnetic wave form could include signals sent over a network from a server computer to a client computer.

D. Conclusion

A method and apparatus for matching projects and workers has been described. Both mandatory, or binary, characteristics and quantitative characteristics can be considered in matching projects and workers. Additionally, the system is symmetrical and allows projects to be matched with workers and vice versa—an "exchange" system. The foregoing description of various embodiments of the invention has been presented for purposes of illustration and description. It is not intended to limit the invention to the precise forms disclosed. Many modifications and equivalent arrangements will be apparent.

What is claimed is:

1. A method of matching a project to a subset of a plurality of workers, the method comprising:

defining the project, the project having a corresponding plurality of binary characteristics and a corresponding plurality of quantitative characteristics;

defining a plurality of workers, each worker in the plurality of workers having a corresponding plurality of binary characteristics and a corresponding plurality of quantitative characteristics;

matching the project to the subset of the plurality of workers using the corresponding pluralities of binary characteristics, the subset of the plurality of workers comprising workers in the plurality of workers whose corresponding plurality of binary characteristics match the project's corresponding plurality of binary characteristics;

refining the subset of the plurality of workers to include the top n workers as determined by a rating for each of the workers in the subset according to each worker's corresponding plurality of quantitative characteristics and the project's corresponding plurality of quantitative characteristics; and including, prior to the step of refining, a measure indicative of feedback electronically provided by a particular worker of the plurality of workers in a quantitative characteristic of the corresponding plurality of quantitative characteristics for that particular worker, wherein including the measure indicative of feedback results in a higher rating for the particular worker than that rating which would result if the measure indicative of feedback was not included, thus rewarding the particular worker for electronically providing the feedback.

2. The method of claim 1, where the project's plurality of corresponding binary characteristics includes one or more of an activity, a location, and an industry.

3. The method of claim 1, wherein the plurality of quantitative characteristics for each worker includes one or more of an experience, a cost, a start time and an end time, a bid amount, reputation information, and financial information.

4. The method of claim 1, wherein the refining comprises:

computing a plurality of coefficients for each worker in the subset of workers, each coefficient corresponding to a quantitative characteristic in the corresponding plurality of quantitative characteristics for a worker;

computing the rating for each worker in the subset of workers using a weighted average of the plurality of coefficients and a plurality of weights, each of the plurality of weights corresponding to a quantitative characteristic in the corresponding plurality of quantitative characteristics for a worker; and retaining in the subset of workers only the n workers with the highest corresponding rating.

5. The method of claim 4, wherein the project includes the plurality of weights for adjusting the impact of the quantitative characteristics for each worker in the subset of workers.

6. The method of claim 4, wherein if the project does not include the plurality of weights, the plurality of weights is determined from a predetermined plurality of weights.

7. The method of claim 1, wherein at least some of the workers have a corresponding quantitative characteristic that indicates a level of participation in the system.

8. The method of claim 1, wherein at least some of the workers have a corresponding quantitative characteristic that indicates a level of past work performance.

9. The method of claim 1, wherein at least some of the workers have a corresponding quantitative characteristic that indicates a corresponding indication of how often the worker included a bid and how good the worker was at paying the bid.

10. A method of matching projects with workers using a computer system, the method comprising:

defining the projects, each project having at least one corresponding binary characteristic and at least one corresponding quantitative characteristic;

defining the workers, each worker having at least one corresponding binary characteristic and at least one corresponding quantitative characteristic that includes corresponding worker reputation information, wherein for at least some of the workers, the worker reputation information is defined by at least one worker evaluation related to the worker, and feedback electronically provided by the worker regarding at least one past project;

matching the workers to projects using the corresponding binary characteristics to determine preliminary groups of matching workers for corresponding projects, each preliminary group comprising workers whose at least one corresponding binary characteristic matches the at least one corresponding binary characteristic of the corresponding project; and refining the preliminary groups to create final groups by including the top n workers in each preliminary group as determined by a rating for each of the workers in the corresponding preliminary group, the rating for each of the workers based at least in part on the corresponding worker reputation information for each worker, wherein provision of the feedback by a particular worker of the workers prior to the step of refining has a positive effect on the at least one corresponding quantitative characteristic that includes the corresponding worker reputation information for that particular worker and on the rating for that particular worker.

11. The method of claim 10, wherein the at least one corresponding binary characteristic of each project includes one or more of an activity, a location, and an industry.

12. The method of claim 10, wherein the at least one corresponding quantitative characteristics for each worker includes one or more of an experience, a cost, a start time and an end time, a bid amount, reputation information, and financial information.

13. The method of claim 10, wherein each project has at least one project creator.

14. The method of claim 13, wherein the at least one corresponding quantitative characteristic of each worker further includes corresponding project reputation information defined by one or more of at least one project evaluation related to the projects, feedback provided by the worker about at least one project of the projects, and feedback provided by the worker about the at least one project creator of at least one project of the projects.

15. The method of claim 14, wherein the the rating in the refining step is further based on the corresponding project reputation information.

16. The method of claim 14, wherein the corresponding project reputation information is available to the workers when evaluating whether to accept a project.

17. The method of claim 14, wherein, for each project, the at least one project creator is capable of being excluded from creating new projects according to the corresponding project reputation information.

18. The method of claim 14, further comprising: excluding projects from the matching of the workers to projects according to the corresponding project reputation information.

19. The method of claim 13, wherein, for each project, the corresponding worker reputation information is available to the at least one project creator.

20. An internet based matching system to match workers to projects, the system comprising:
   a server having the projects, the server being coupled in communication with the Internet, each project having at least one corresponding binary characteristic and at least one corresponding quantitative characteristic; the server further having the workers, each worker having at least one corresponding binary characteristic and at least one corresponding quantitative characteristic that includes corresponding worker reputation information, wherein for at least some of the workers, the worker reputation information is defined by at least one worker evaluation related to the worker, and feedback electronically provided by the worker regarding at least one past project; and
   a matching program, the matching program being coupled in communication with the server, the matching program matching the workers to projects using the corresponding binary characteristics to determine preliminary groups of matching workers for corresponding projects, each preliminary group comprising workers whose at least one corresponding binary characteristic matches the at least one corresponding binary characteristic of the corresponding project; the matching program further to refine the preliminary groups to create final groups by including the top n workers in each preliminary group as determined by a rating for each of the workers in the corresponding preliminary group, the rating for each of the workers based at least in part on the corresponding worker reputation information for each worker, wherein provision of the feedback by a particular worker of the workers prior to the preliminary groups being refined by the matching program has a positive effect on the at least one corresponding quantitative characteristic that includes the corresponding worker reputation information for that particular worker and on the rating for that particular worker.

21. A matching system to match workers to projects, the system comprising:
   means for defining the projects, each project having at least one corresponding binary characteristic and at least one corresponding quantitative characteristic;
   means for defining the workers, each worker having at least one corresponding binary characteristic and at least one corresponding quantitative characteristic that includes corresponding worker reputation information, wherein for at least some of the workers, the worker reputation information is defined by at least one worker evaluation related to the worker, and feedback electronically provided by the worker regarding at least one past project;
   means for matching the workers to projects using the corresponding binary characteristics to determine preliminary groups of matching workers for corresponding projects, each preliminary group comprising workers whose at least one corresponding binary characteristic matches the at least one corresponding binary characteristic of the corresponding project; and
   means for refining the preliminary groups to create final groups by including the top n workers in each preliminary group as determined by a rating for each of the workers in the corresponding preliminary group, the rating for each of the workers based at least in part on the corresponding worker reputation information for each worker, wherein provision of the feedback by a particular worker of the workers prior to the preliminary groups being refined has a positive effect on the at least one corresponding quantitative characteristic that includes the corresponding worker reputation information for that particular worker and on the rating for that particular worker.

22. A method of matching projects with workers using a computer system, the method comprising:
   matching the workers to projects using binary characteristics specific to the workers and the projects to determine preliminary groups of matching workers for corresponding projects, each preliminary group comprising workers having at least one corresponding binary characteristic matching at least one corresponding binary characteristic for the project corresponding to the preliminary group; and
   refining the preliminary groups to create final groups by including the top n workers in each preliminary group as determined by a rating for each of the workers in the corresponding preliminary group, the rating based at least in part on corresponding worker reputation information for each worker and on corresponding project reputation information for the corresponding project, wherein the corresponding project reputation information is obtained from one or more of at least one project evaluation related to the project, feedback electronically provided by at least one worker about the project, and feedback electronically provided by at least one worker about at least one project creator of the project, and wherein any electronic provision of feedback by any of the workers prior to the step of refining is used to supplement corresponding worker reputation information for that worker and is used to determine the rating for that worker if the worker belongs to the preliminary group.

23. The method of claim 22, further comprising:

obtaining the corresponding worker reputation information from one or more of at least one worker evaluation related to the worker, and feedback provided by the worker in the past.

24. A method of matching projects with workers using a computer system, the method comprising:

defining the projects, each project having at least one corresponding binary characteristic and at least one corresponding quantitative characteristic;

defining the workers, each worker having at least one corresponding binary characteristic and at least one corresponding quantitative characteristic, wherein for at least some of the workers the at least one corresponding quantitative characteristic includes a bid amount and an indication of how often the worker included a bid and a bid payment history of the worker;

matching the workers to projects using the corresponding binary characteristics to determine preliminary groups of matching workers for corresponding projects, each preliminary group comprising workers whose at least one corresponding binary characteristic matches the at least one corresponding binary characteristic of the corresponding project; and refining the preliminary groups to create final groups by including the top n workers in each preliminary group as determined by a rating for each of the workers in the corresponding preliminary group according to the at least one corresponding quantitative characteristic for each worker and the at least one corresponding quantitative characteristic for the corresponding project.

* * * * *